United States Patent
Tham et al.

(10) Patent No.: US 11,319,819 B2
(45) Date of Patent: May 3, 2022

(54) TURBINE BLADE WITH SQUEALER TIP AND DENSIFIED OXIDE DISPERSION STRENGTHENED LAYER

(71) Applicant: Siemens Energy Global GmbH & Co. KG, Munich (DE)

(72) Inventors: Kok-Mun Tham, Oviedo, FL (US); Ching-Pang Lee, Cincinnati, OH (US); Li Shing Wong, Oviedo, FL (US); Sin Chien Siw, Oviedo, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 66 days.

(21) Appl. No.: 16/616,100

(22) PCT Filed: May 1, 2018

(86) PCT No.: PCT/US2018/030379
§ 371 (c)(1),
(2) Date: Nov. 22, 2019

(87) PCT Pub. No.: WO2018/222326
PCT Pub. Date: Dec. 6, 2018

(65) Prior Publication Data
US 2020/0157951 A1 May 21, 2020

Related U.S. Application Data

(60) Provisional application No. 62/512,346, filed on May 30, 2017.

(51) Int. Cl.
| | |
|---|---|
| *F01D 5/20* | (2006.01) |
| *F01D 5/28* | (2006.01) |
| *F01D 5/18* | (2006.01) |

(52) U.S. Cl.
CPC ............... *F01D 5/20* (2013.01); *F01D 5/288* (2013.01); *F01D 5/186* (2013.01);
(Continued)

(58) Field of Classification Search
CPC ............................ F01D 5/20; F05D 2240/307
See application file for complete search history.

(56) References Cited

U.S. PATENT DOCUMENTS

| | | | | |
|---|---|---|---|---|
| 3,821,036 A | * | 6/1974 | O Brien | C22C 1/1078 419/29 |
| 5,049,355 A | * | 9/1991 | Gennari | C22C 32/0031 420/425 |

(Continued)

FOREIGN PATENT DOCUMENTS

| | | |
|---|---|---|
| CN | 1982654 A | 6/2007 |
| CN | 103958834 A | 7/2014 |

(Continued)

OTHER PUBLICATIONS

PCT International Search Report and Written Opinion dated Jul. 4, 2018 corresponding to PCT Application No. PCT/US2018/030379 filed May 1, 2018.

(Continued)

*Primary Examiner* — Eldon T Brockman

(57) ABSTRACT

A blade (10) for a turbine engine that includes an internal cooling system (56) formed from at least one cavity (58) positioned within a generally elongated airfoil (12). A squealer tip (36) and at least one densified oxide dispersion strengthened layer (38) extend radially from a radially outer tip cap (70) of the blade (10), the tip cap (70) having a tip cap upper surface (50).

16 Claims, 4 Drawing Sheets

(52) U.S. Cl.
CPC .. *F05D 2240/307* (2013.01); *F05D 2260/202* (2013.01); *F05D 2300/21* (2013.01); *F05D 2300/611* (2013.01)

(56) References Cited

U.S. PATENT DOCUMENTS

| | | | | |
|---|---|---|---|---|
| 6,039,531 | A * | 3/2000 | Suenaga | F01D 5/186 |
| | | | | 415/115 |
| 6,179,556 | B1 * | 1/2001 | Bunker | F01D 5/187 |
| | | | | 415/115 |
| 6,235,370 | B1 | 5/2001 | Merrill et al. | |
| 6,554,575 | B2 * | 4/2003 | Leeke | F01D 5/186 |
| | | | | 416/224 |
| 6,672,829 | B1 * | 1/2004 | Cherry | F01D 5/141 |
| | | | | 415/115 |
| 6,991,430 | B2 * | 1/2006 | Stec | F01D 5/141 |
| | | | | 415/115 |
| 8,469,666 | B1 | 6/2013 | Liang | |
| 8,801,377 | B1 | 8/2014 | Liang | |
| 9,249,670 | B2 * | 2/2016 | Bunker | F01D 5/186 |
| 2003/0059304 | A1 * | 3/2003 | Leeke | F01D 5/186 |
| | | | | 416/97 R |
| 2003/0082054 | A1 * | 5/2003 | Grylls | F01D 11/125 |
| | | | | 416/224 |
| 2004/0013515 | A1 * | 1/2004 | Cherry | F01D 5/145 |
| | | | | 415/115 |
| 2004/0197190 | A1 * | 10/2004 | Stec | F01D 5/141 |
| | | | | 416/97 R |
| 2007/0128033 | A1 | 6/2007 | Lee et al. | |
| 2013/0156600 | A1 * | 6/2013 | Bunker | F01D 5/186 |
| | | | | 416/97 R |
| 2013/0298400 | A1 | 11/2013 | Munshi et al. | |
| 2013/0302166 | A1 * | 11/2013 | Lee | F01D 11/14 |
| | | | | 416/95 |
| 2014/0322028 | A1 | 10/2014 | Grohens et al. | |
| 2015/0361808 | A1 * | 12/2015 | Botrel | F01D 5/02 |
| | | | | 415/208.3 |

FOREIGN PATENT DOCUMENTS

| | | | | |
|---|---|---|---|---|
| EP | 1079072 | A2 | 2/2001 | |
| FR | 3022295 | A1 | 12/2015 | |
| GB | 1505794 | A * | 3/1978 | C22C 1/04 |
| JP | 2015517624 | A | 6/2015 | |
| JP | 2015517625 | A | 6/2015 | |
| WO | 2013169747 | A1 | 11/2013 | |
| WO | 2013169754 | A1 | 11/2013 | |

OTHER PUBLICATIONS

Minz, Z. et al.: "Fabrication and characterization of additive manufactured nickel-based ODS coating layer for high temperature application"; Compendex, Engineering Information, Inc.; New York, US; Jan. 1, 2017 (Jan. 1, 2017); XP002791888.

* cited by examiner

US 11,319,819 B2

TURBINE BLADE WITH SQUEALER TIP AND DENSIFIED OXIDE DISPERSION STRENGTHENED LAYER

BACKGROUND

1. Field

The present invention relates to turbine blades for a gas turbine and, more particularly, to squealer tips and densified oxide dispersion strengthened layers.

2. Description of the Related Art

In an industrial gas turbine engine, hot compressed gas is produced. The hot gas flow is passed through a turbine and expands to produce mechanical work used to drive an electric generator for power production. The turbine generally includes multiple stages of stator vanes and rotor blades to convert the energy from the hot gas flow into mechanical energy that drives the rotor shaft of the engine. Turbine inlet temperature is limited by the material properties and cooling capabilities of the turbine parts.

A combustion system receives air from a compressor and raises it to a high energy level by mixing in fuel and burning the mixture, after which products of the combustor are expanded through the turbine.

Gas turbines are becoming larger, more efficient, and more robust. Large blades and vanes are being produced, especially in a hot section of the engine system. As a result, turbine blades must be made of materials capable of withstanding such high temperatures.

A turbine blade is formed from a root portion coupled to a rotor disc and an elongated portion forming a blade that extends outwardly from a platform coupled to the root portion at an opposite end of the turbine blade. The blade is ordinarily composed of a tip opposite the root section, a leading edge, and a trailing edge. During operation, fluid tip flow leakage can occur over the tip of the turbine blade which reduces the working efficiency of the turbine.

SUMMARY

In one aspect of the present invention, a blade for a turbine engine comprises: a generally elongated airfoil comprising a leading edge, a trailing edge connecting a pressure side and a suction side, a radially outer tip cap having a tip cap upper surface at a tip end of the airfoil, a root coupled to the elongated airfoil generally opposite the tip end supporting the blade and for coupling the blade to a disc, and an internal cooling system formed from at least one cavity positioned within the generally elongated airfoil; a squealer tip extending radially from the tip cap upper surface comprising at least a first tip cap rib and a second tip cap rib; and at least one densified oxide dispersion strengthened layer deposited on and extending radially outward from the tip cap upper surface.

In another aspect of the present invention, a blade for a turbine engine comprises: a generally elongated airfoil comprising a leading edge, a trailing edge connecting a pressure side and a suction side, a radially outer tip cap having a tip cap upper surface at a tip end of the airfoil, a root coupled to the elongated airfoil generally opposite the tip end supporting the blade and for coupling the blade to a disc, and an internal cooling system formed from at least one cavity positioned within the generally elongated airfoil; a squealer tip extending radially from the tip cap upper surface comprising at least a first tip cap rib and a second tip cap rib, wherein the squealer tip is at least one densified oxide dispersion strengthened layer deposited on and extending radially outward from the tip cap upper surface.

These and other features, aspects and advantages of the present invention will become better understood with reference to the following drawings, description and claims.

BRIEF DESCRIPTION OF THE DRAWINGS

The invention is shown in more detail by help of figures. The figures show preferred configurations and do not limit the scope of the invention.

DETAILED DESCRIPTION

Figure 1:
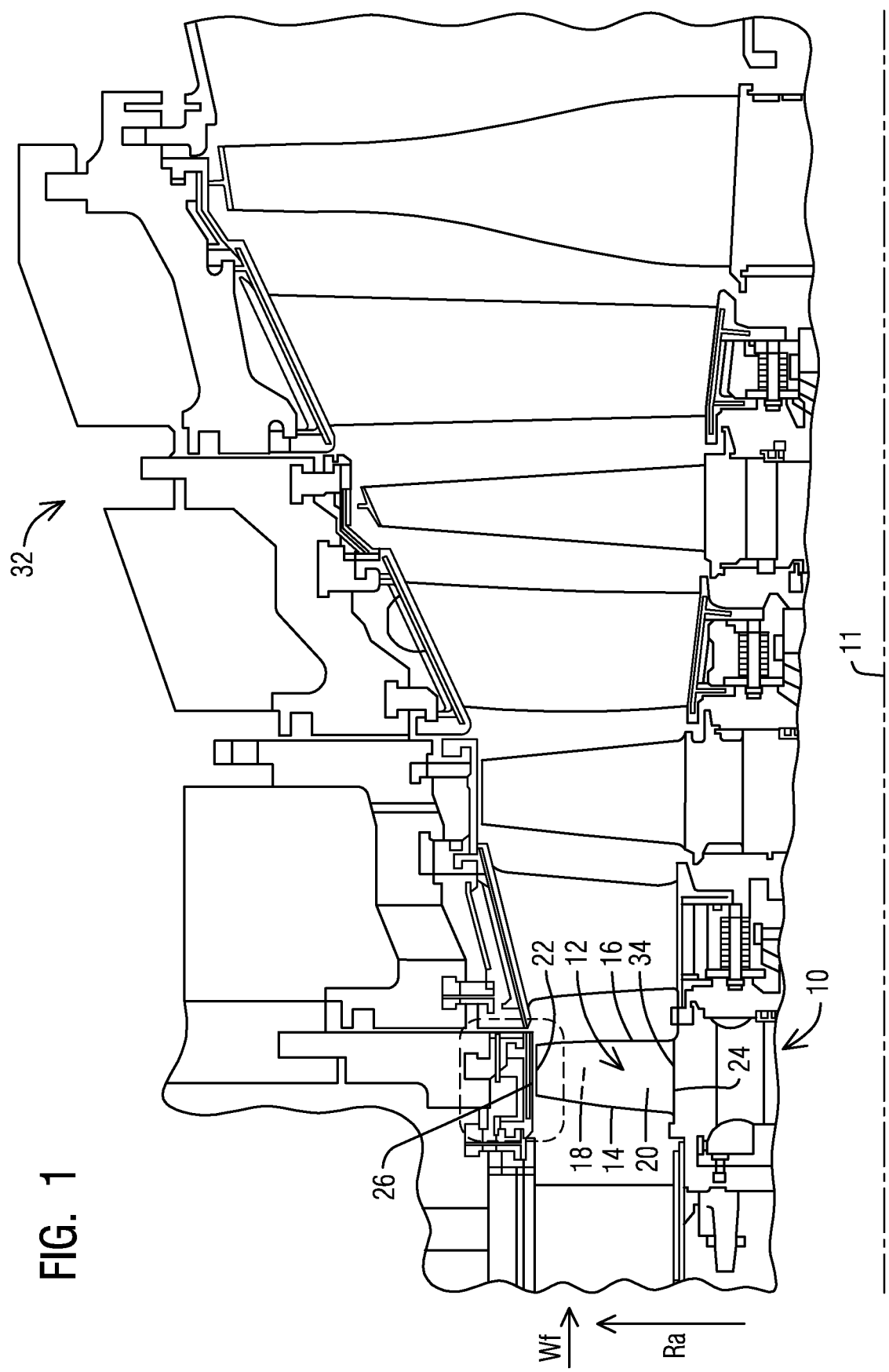
FIG. 1 is an axial cross-sectional view of a gas turbine engine with a row of turbine blades wherein embodiments of the present invention may be incorporated.

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Broadly, an embodiment of the present invention provides a blade for a turbine engine that includes an internal cooling system formed from at least one cavity positioned within a generally elongated airfoil. A squealer tip and at least one densified oxide dispersion strengthened layer extend radially from a radially outer tip cap of the blade, the tip cap having a tip cap upper surface.

A gas turbine engine may comprise a compressor section, a combustor and a turbine section. The compressor section compresses ambient air. The combustor combines the compressed air with a fuel and ignites the mixture creating combustion products comprising hot gases that form a working fluid. The working fluid travels to the turbine section. Within the turbine section are circumferential alternating rows of vanes and blades, the blades being coupled to a rotor. Each pair of rows of vanes and blades forms a stage in the turbine section. The turbine section comprises a fixed turbine casing, which houses the vanes, blades and rotor.

The turbine blades include a radially inner root and a radially outer tip. The tip of a turbine blade can have a tip feature to reduce the size of the gap between ring segments and blades in the gas path of the turbine to prevent tip flow leakage, which reduces the amount of torque generated by the turbine blades. The tip features can be referred to as squealer tips and incorporated onto the tips of blades to help reduce aerodynamic losses between turbine stages. These features are designed to minimize the leakage between the blade tip and the ring segment.

Ring segments are located over the rotating blades forming the flow path outer annulus. The blade tips and an inner hot surface of the each ring segment form a small gap. The size of the gap changes due to thermal properties of the blade and ring segment from cold states to a hot running stage of the turbine. The smaller the gap, the less hot gas leakage flows between the blade tips and the ring segments. To decrease the hot gas leakage flow and maintain tight turbine hot-running tip gaps, a thin coating can be applied along a radially inner surface of the ring segment to insulate the ring segment from the hot gas flow and to reduce the metal temperature of the ring segment. Reducing the metal temperature reduces the required cooling air flow which in turn can improve the turbine efficiency. A coating such as a thermal barrier coating (TBC) is one such coating. It is beneficial for the coating on the ring segment to have good abradability when blade tip incursion occurs. In this situation, a local circumferential cut on the coating occurs as opposed to heavy wear on a squealer tip of each blade. On front turbine stages, a porous TBC can be applied on the ring segments. The porous TBC provides a forgiving surface able to cope with various effects that cause clearance eccentricity or out-of-roundness, such as distortion on casing, manufacturing or assembly effects, or the like. The porous TBC layer on the ring segment, however, can also result in coating erosion which is undesirable.

Turbine aerodynamic performance has a strong impact on the overall gas turbine engine efficiency considering the location of the turbine within the system. A major component of turbine aerodynamic loss is from the blade overtip leakage, which increases the lost opportunity for work extraction along with aerodynamic secondary losses. Tight operating tip gaps and squealer tip geometries can maximize turbine aerodynamic performance which is desired.

Because the squealer is away from any cooling circuit, it is very difficult to maintain an acceptable metal temperature. Because the squealer is conventionally subject to rubbing against the ring segment, heavy wear occurs along the squealer tip which eventually increases the gap and increases tip flow leakage. A reduction in the gap is desirable.

Referring to FIG. 1, a portion of a turbine engine 32 is shown. A centerline 11 is shown to represent an axial center of the turbine engine 32. A radial direction Ra is shown in a direction that is radially outward. Further, a working fluid Wf direction is shown. A turbine blade 10 is formed from a root portion 34 coupled to a rotor disc (not shown) and an elongated portion forming an airfoil 12 that extends outwardly from a platform 24 coupled to the root portion 34. At an opposite end of the turbine blade 10, the blade 10 is composed of a tip 22 opposite the root section 34, a leading edge 14, and a trailing edge 16. Connecting the leading edge 14 and the trailing edge 16 is radially extending a pressure side 18 and a suction side 20 of the airfoil 12. Along the tip end 22 of the turbine blade 10 is a tip feature in position to reduce the size of the gap between ring segments 26 and blades 10 in a gas path of a turbine to prevent tip flow leakage, which reduces the amount of torque generated by the turbine blades 10. The tip feature is referred to as a squealer or squealer tip 36 and is incorporated onto the tips of blades to help reduce aerodynamic losses between turbine stages. These features are designed to minimize the leakage between the blade tip 22 and the ring segment 26.

Figure 2:
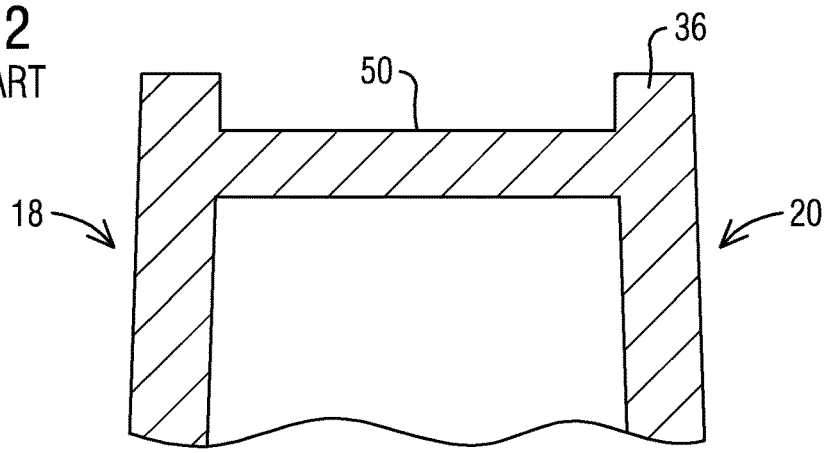
FIG. 2 is a partial cross-sectional view of a prior art configuration of a blade and squealer tip.

FIG. 2 represents a conventional squealer tip 36 location where spaced apart tip walls extend directly up from and extending the length of the pressure side 18 and suction side 20 of the blade 10. Squealer tips 36 of embodiments of the present invention, however, include a first tip cap rib 72 or extension and a second tip cap rib 74 or extension, both extending radially outward from a tip cap upper surface 50 of a tip cap 70 along the tip end 22 of the blade 10 as is shown in FIGS. 3 through 6.

Figure 3:
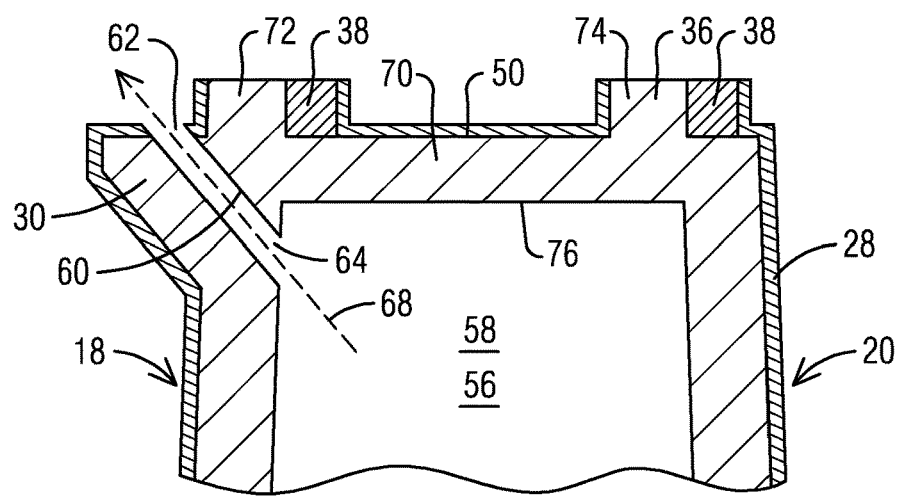
FIG. 3 is a partial cross-sectional view of a turbine blade with a squealer tip and at least one densified oxide dispersion strengthened (ODS) layer according to an exemplary embodiment of the present invention.
Figure 4:
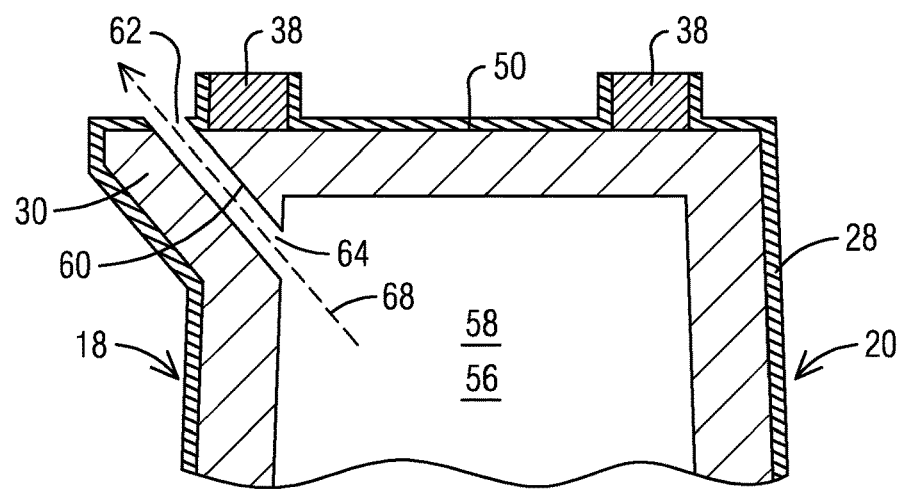
FIG. 4 is a partial cross-sectional view of a turbine blade with a squealer tip and at least one densified oxide dispersion strengthened (ODS) layer according to an exemplary embodiment of the present invention.
Figure 5:
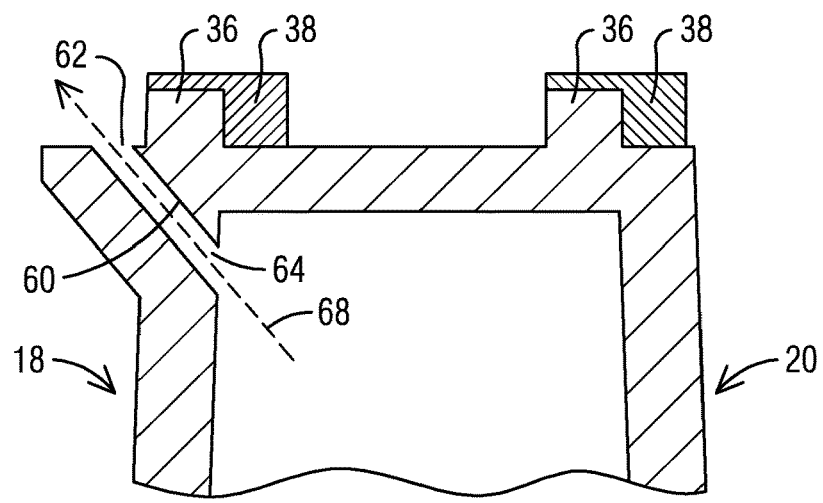
FIG. 5 is a partial cross-sectional view of a turbine blade with a squealer tip and at least one densified oxide dispersion strengthened (ODS) layer according to an exemplary embodiment of the present invention.
Figure 6:
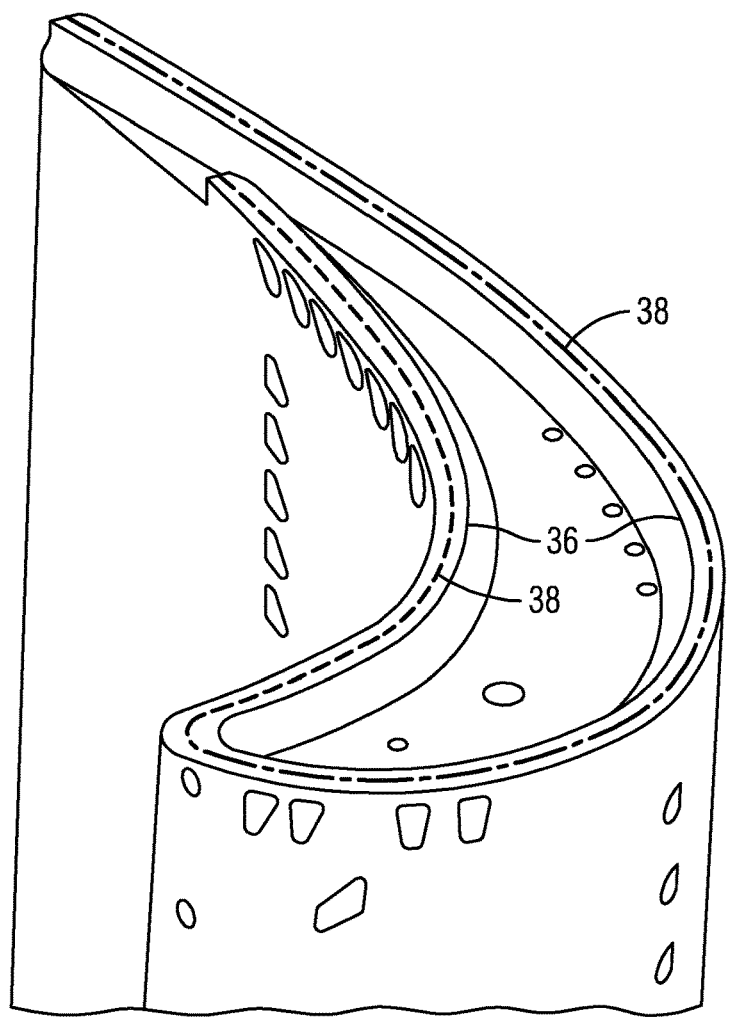
FIG. 6 is a detailed view of the squealer tip at the leading edge of a turbine blade according to an exemplary embodiment of the present invention.

FIG. 3 further references an internal cooling circuit, also known as a cooling system 56. The cooling system 56 is under a tip cap 70 that is along the tip 22 of the blade 10 where the cooling system 56 is mainly internal to the blade 10. The cooling system 56 may have various different pathways, some in a serpentine fashion, or in various directions. The cooling system 56 allows for a cooling fluid 68 to move about and reduce the temperature of within and along the blade 10. The cooling system 56 is directed to produce a focus of cooling fluid 68 on and around locations that require more cooling than others along the blade 10. The cooling system 56 allows for the flow of cooling fluid along an inner surface of the blade tip 22. Along the tip 22 of the blade 10 is the tip cap 70. The tip cap 70 has a tip cap inner surface 76 and a tip cap outer surface 50.

The squealer tip 36 may be a sacrificial feature of a turbine blade 10 to maintain a small tip clearance for better turbine efficiency and protect a blade cooling system 56 that is under the tip cap 70 along the tip 22 of the blade 10. Reducing the squealer tip 36, however, increases the gap between the blade tip 22 and the ring segment 26. Eliminating the reduction of the squealer tip 36, or increasing the life cycle time before reduction takes place along the squealer tip 36 is provided with embodiments described herein. In certain embodiments of the present invention, the squealer tip 36 is positioned between the tip cap 70 and the ring segment 26 in the event of tip rubbing against the ring segment 26 during a transient engine operation. Because the squealer 36 is away from the cooling system 56, it is very difficult to maintain an acceptable metal temperature. Because the squealer 36 is subject to rubbing against the ring segment 26, no thermal barrier coating (TBC) 28 is applied on the squealer radially outer most surface in order to be able to help reduce the temperature.

A reduction in temperature and the maintaining of a small tip leakage along a squealer of a blade is desirable. Embodiments of the present invention provide a blade squealer tip 36 and densified oxide dispersion strengthened layer that may allow for the reduction of tip leakage and reduction of temperature along the squealer.

Referring to FIGS. 3 through 6, the squealer tip 36 is formed from tip cap ribs including at least one first tip cap rib 72 and at least one second tip cap rib 74 extending radially outward from the tip cap upper surface 50 of the turbine blade 10. In certain embodiments, the squealer tip 36 is formed so that the at least one of the first tip cap rib 72 and the second tip cap rib 74 is offset from an extension of at least one of the pressure side 18 and/or the suction side 20 of the blade 10 in the inward circumferential direction, i.e.

towards the center of the blade 10. An example can be seen in FIG. 3 for the squealer tip 36 on the right side of the figure.

Having an offset squealer tip 36 allows for the potential of improved cooling by direct conduction cooling of the first tip cap rib 72 and/or the second tip cap rib 74. The direct conduction cooling can come from the internal cooling system 56 in contact with the tip cap 70. Direct conduction cooling occurs since the first tip cap rib 72 and/or the second tip cap rib 74 are offset from a side of the blade 10 and are directly above the tip cap 70 over the internal cooling system 56, versus the first tip cap rib 72 and the second tip cap rib 74 extending along the pressure side 18 or suction side 20 of the blade 10 extending radially.

At least one densified oxide dispersion strengthened (ODS) layer 38 is deposited on the tip end 22 of the blade 10. The location of the ODS layers 38 can vary based on the embodiment. In certain embodiments, the ODS layer 38 is positioned flush with and to the suction side 20 of each tip cap rib 72, 74 of the squealer tip 36 (See FIG. 3). In certain embodiments, the ODS layer 38 is positioned as the tip cap ribs 72, 74 where each tip cap rib 72, 74 of the squealer tip 36 is made from an ODS layer 38 material (See FIG. 4). Further, in certain embodiments, the ODS layer 38 is positioned flush with and to the suction side 20 of each tip cap rib 72, 74, as well as, on a top radially outward surface of each tip cap rib 72, 74 along the squealer tip 36 (See FIGS. 5 and 6). In embodiments where the at least one ODS layer 38 is positioned only flush along the suction side of each tip cap rib 72, 74, the ODS layer 38 radial height is either approximately even with the tip cap rib 72, 74, or positioned slightly higher radially outward than the tip cap rib 72, 74. Each densified ODS layer can be formed through direct deposition with laser assisted process, that is largely governed by, but not limited to, the laser power and scanning speed. When the laser power is too low, there is not enough power to sufficiently create a melt pool 46 and to melt the ODS powder that will be explained in detail below. Further, low laser power can only create a sintering effect that is not desired.

In each of these embodiments, the at least one ODS layer 38 takes the main contact and any damage due to rubbing against the ring segment 26. The ODS layer 38 takes the place of the squealer tip 36 for a cutting edge into the TBC layer 28 of the ring segment 26. The cutting edge of the ODS layer 38 can last longer than a conventional tip with regards to blade tip incursion into the ring segment 26. Allowing the ODS layer 38 to make the first contact with the ring segment 26 avoids engine "break in" cycle that is designed to have the worst blade tip incursion into the ring segment abradable coating (i.e TBC or the like), thus minimizing operating tip gap and maintaining engine performance at optimum level. By adding at least one densified ODS layer 38 as the cutting edge on the blade tip 22, the porosity of the ring segment abradable TBC can be reduced improving erosion resistance. The tip cap ribs 72, 74 may have a smaller radial height than the at least one ODS layer 38 as mentioned above to provide further protection of the tip cap ribs 72, 74. Even if the at least one ODS layer 38 on the blade tip 22 is oxidized, there would still be the rest of the squealer tip 36 to form a tight steady-state tip gap.

The internal cooling system 56 may be formed from at least one cavity 58 positioned within the generally elongated airfoil 12. The cooling system 56 may have any appropriate configuration to cool the turbine blade 10 during use in an operating gas turbine engine. The turbine blade 10 and its related components listed above may be formed from any appropriate material already known in the art or yet to be discovered or identified.

The tip cap 70 may include at least one film cooling hole 60 running through. The at least one film cooling hole 60 having an exhaust outlet 62 positioned along the tip cap upper surface 50. The at least one film cooling hole 60 includes an inlet 64 that couples the at least one film cooling hole 60 with the cavity 58 that includes the internal cooling system 56. The at least one film cooling hole 60 may be positioned in between the first tip cap rib 72 and the pressure side 18 of the blade 10 along the tip cap 70.

In certain embodiments, the pressure side 18 of the blade 10 may include an acute angled ledge 30 at the tip end 22 of the blade 10 that extends opens out radially outward from beyond a plane extending along the majority of the pressure side of the blade 10 and at an acute angle away from the blade 10. The angled ledge 30 may be positioned so that the at least one film cooling hole 60 may exit further along the tip cap upper surface 50 farther from the tip cap rib 72. The addition of the angled ledge 30 discourages tip leakage flow from the pressure side 18 to the suction side 20 of the blade 10 by angling the working fluid flow away from the gap across the blade 10 and by moving the flow further away from the path to the suction side 20. Further it provides a shield for the film cooling flow on the blade tip 22. By lengthening the surface space of the tip cap upper surface 50 upstream of the first tip cap rib 72, the exiting cooling fluid 68 is allowed to move along the surface for an extended amount of time. Additionally, the exit of the at least one film cooling hole 60 may be allowed to increase in size. This angled ledge 30 through the increase tip cooling effectiveness counters tip oxidation.

The acute angled ledge 30 may include a bottom portion and a top portion. The bottom portion extends out at the acute angle while the top portion may continue the acute angle, or have a radially parallel path as the majority of the pressure side 18. The top portion extending until it is approximately the same radial height as the tip cap upper surface 50.

The tip cap 70 may have a thermal barrier coating 28 on the tip cap upper surface 50. In certain embodiments the thermal barrier coating 28 may also be applied to any exposed side of the squealer tip 36 or the at least one ODS layer 38 as well. Thermal barrier coating 28 may be applied to the outer surfaces forming the pressure side 18 and the suction side 20 of the blade 10 as well.

As is shown in FIG. 3, an example of an embodiment during use, a cooling fluid 68 is within the internal cooling system 56. The cooling fluid 68 may be passed into the at least one film cooling hole 60 of the turbine blade 10 through the inlet 64. The cooling fluid 68 may then exit out of the at least one film cooling hole 60 through the exhaust outlet 62 cooling areas along the tip cap 70.

Figure 7:
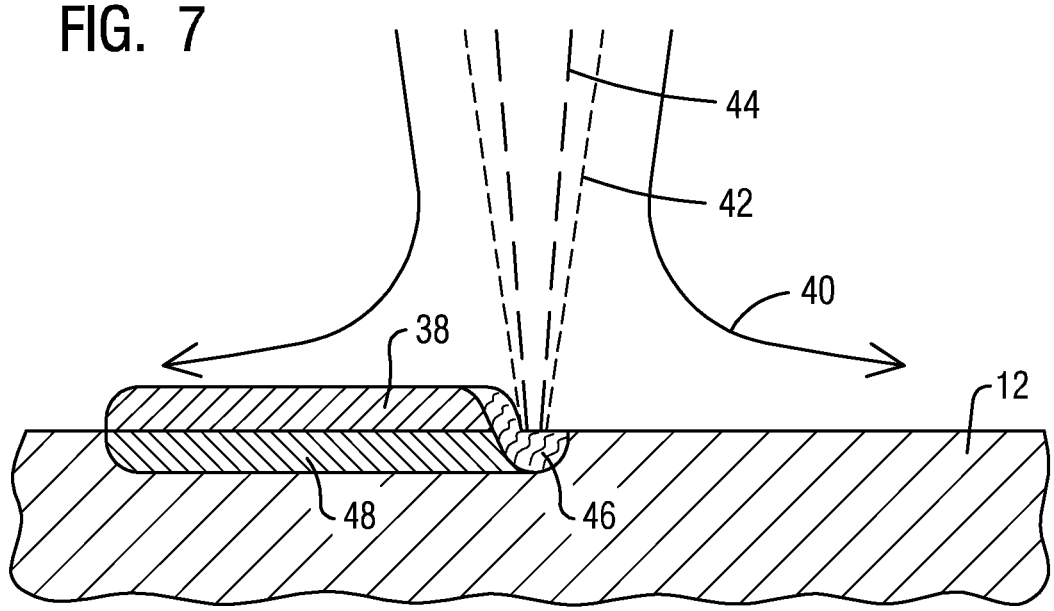
FIG. 7 is a front view of a manufacturing process of a turbine blade with at least one densified oxide dispersion strengthened (ODS) layer according to an exemplary embodiment of the present invention.
Figure 8:
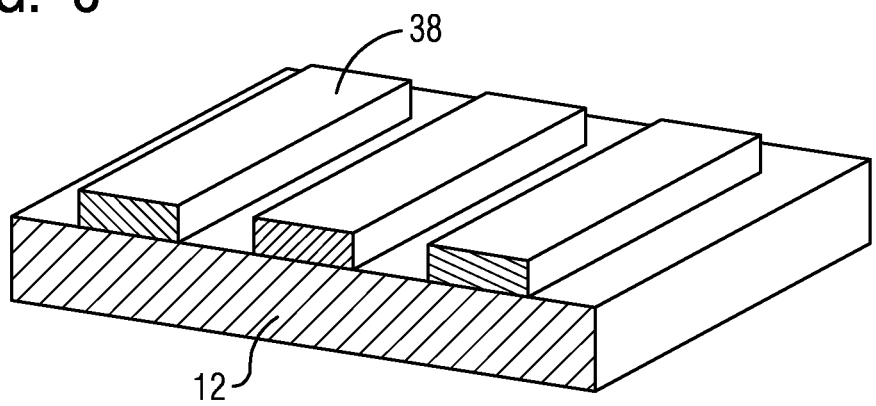
FIG. 8 is a perspective view of a testing of a manufacturing process of a densified oxide dispersion strengthened (ODS) layer added to a substrate (turbine blade) according to an exemplary embodiment of the present invention.

As is illustrated in FIGS. 7-8, the manufacturing process includes using additive manufacturing (AM), such as with direct laser deposition, to deposit each ODS layer 38. The at least one ODS layer 38 is deposited on a substrate material. In these embodiments the substrate is the blade 10 material. In certain embodiments, the ODS layer 38 is deposited on the space along the tip cap upper surface 50 created by the squealer tip offset. The at least one ODS layer 38 is deposited directly on the tip cap upper surface 50 positioned flush and along an exposed side of the squealer 36 first tip cap rib 72 and second tip cap rib 74. In another embodiment, the ODS layer 38 is deposited in a position along the tip cap upper surface 50 as the material of the first tip cap rib 72 and second tip cap rib 74. In another embodiment, the at least one ODS layer 38 is deposited on the tip cap upper surface 50 flush against the first tip cap rib 72 and the second tip cap rib 74, as well as deposited on a radially outward surface of the first tip cap rib 72 and the second tip cap rib 74. The ODS layer 38 then becomes a sacrificial cutting edge into the porous TBC on the ring segment. Even when there is reliable TBC abradability, there will be some blade tip wear when bare metals contact the ceramic material. The addition of the ODS layer 38 allows for the squealer tip 36 to remain as is for a longer amount of time which can increase the lifespan of the component. The at least one ODS layer 38 may be deposited on the blade tip 22 prior to any TBC layer 28 that may be added.

For the additive manufacturing, the process may include a laser beam 44 with a nozzle assembly that can deposit ODS powder that can be positioned above the blade tip 22, with the laser pointing in the vertically downward direction towards the tip cap upper surface 50 as an example of a location for the ODS layer 38. The ODS powder can utilize an oxide evenly distributed throughout a matrix to maintain strength at higher temperatures than conventional superalloys. A localized melt pool 46 may be created by the laser beam 44, in which, the ODS powder can be deposited through a powder stream 42 of the nozzle assembly. The ODS powder is then rapidly melted and forms a new layer in a dilution area 48 that is fusion bonded to the substrate, such as the blade 10 or the tip cap upper surface 50 in this example. The densified layer 38 is formed as the nozzle assembly and laser moves away from the melt pool 46. Typically a shield gas 40 can be used as a gas carrier for transporting the ODS powder from a powder feeder to the laser beam 44 with a nozzle assembly, and there deposited into the melt pool 46. The gas that is used as a gas carrier can be a gas that can also act as a shielding gas that helps eliminate oxidation during the deposition process. The geometry, thickness, and density of each ODS layer 38 can be adjusted by parameters such as, but not limited by laser power, deposition amount, deposition speed, hatch spacing and the like. Once the at least one ODS layer 38 is completed, the entire component, such as the turbine blade 10 in this case, can be removed and heat-treated, hot-isostatic-pressed, machined, or finished in any customary manner. If a TBC layer 28 is being added to the blade, it can be added at this time once the deposit of the at least one ODS layer 38 has been completed.

FIG. 8 shows various ODS layers 38 being deposited by using different laser power ranges. The ODS layers 38 are being deposited on a substrate such as a superalloy. These superalloys can be found as the base materials for turbine blades 10. Detailed microstructure evaluations have shown that there is no discontinuity at the interface between the ODS layers 38 and the substrate, proving that that ODS layer 38 is successfully fusion bonded onto the substrate.

With the addition of the at least one ODS layer 38, the porousness of the TBC 28 on the ring segment 26 can be decreased. This reduction of porosity of the TBC layer 28 can improve resistant to erosion. The overall density of the blade tip 22 can be higher than that of the ring segment 26. ODS alloys exhibit improved oxidation and corrosion resistance, and mechanical properties at elevated temperatures over a conventional superalloy. The hardness and creep strength of the ODS alloy in comparison is also significantly higher than that of a conventional superalloy and TBC layer 28. Elongated grain structure and dispersion of oxide and other particles make the ODS structure what it is. These features allow the ODS alloy layer to provide superior properties over conventional means. Testing has revealed benefits of the ODS alloys on both oxidation and resistance to TBC spallation. The use of ODS layers 38 can provide an increased temperature resistance or an increase in lifetime for a given temperature. The manufacturing techniques described herewithin allow for the ability to deposit the ODS layers 38 on any nickel based substrate as an example of the type of substrate that can be used in this type of application.

At least one densified ODS layer 38 can improve cutting performance into the ring segment 26. Offsetting the at least first tip cap rib 72 and/or second tip cap rib 74 allows for additional cooling through direct conduction. Adding an acute angled ledge 30 to the pressure side 18 of the blade 10 provides additional cooling via at least one shielded film cooling hole 60 as well as help to discourage the overtip leakage from the pressure side 18 to the suction side 20.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. A blade for a turbine engine comprising:
    a generally elongated airfoil comprising a leading edge, a trailing edge connecting a pressure side and a suction side, a radially outer tip cap having a tip cap upper surface at a tip end of the airfoil, a root coupled to the elongated airfoil generally opposite the tip end supporting the blade and for coupling the blade to a disc, and an internal cooling system formed from at least one cavity positioned within the generally elongated airfoil;
    a squealer tip extending radially outward from the tip cap upper surface comprising at least a first tip cap rib and a second tip cap rib; and
    at least one densified oxide dispersion strengthened layer deposited on and extending radially outward from the tip cap upper surface,
    wherein at least one of the at least the first tip cap rib and the second tip cap rib is offset from an extension of one of the pressure side and suction side of the airfoil in a circumferential inward direction toward a center of the blade,
    further comprising an acute angled ledge that extends out from the pressure side of the airfoil and radially outward at an acute angle away from the airfoil, wherein the acute angled ledge comprises a bottom portion and a top portion, wherein the top portion is approximately the same radial height as the tip cap upper surface, and wherein the at least one film cooling hole is positioned through the acute angled ledge exiting in the top portion.

2. The blade according to claim 1, wherein the at least the first tip cap rib and the second tip cap rib have a smaller radial height than the at least one densified oxide dispersion strengthened layer.

3. The blade according to claim 1, wherein the at least the first tip cap rib and the second tip cap have an approximately equal radial height with the at least one densified oxide dispersion strengthened layer.

4. The blade according to claim 1, wherein the at least one densified oxide dispersion strengthened layer is the material of the at least the first tip cap rib and the second tip cap.

5. The blade according to claim 1, wherein the densified oxide dispersion strengthened layer also is deposited on a radially outmost surface of the at least the first tip cap rib and the second tip cap.

6. The blade according to claim 1, wherein direct conduction cooling from the internal cooling system is applied to the at least one of the at least the first tip cap rib and the second tip cap of the squealer tip.

7. The blade according to claim 1, further comprising at least one film cooling hole positioned in between the first tip cap rib and an edge along the pressure side of the airfoil with an exhaust outlet of the at least one film cooling hole in the tip cap upper surface and an inlet that couples the at least one film cooling hole with the at least one cavity forming the internal cooling system.

8. The blade according to claim 1, further comprising thermal barrier coating on the tip cap upper surface and along each exposed side of the at least the first tip cap rib and the second tip cap of the squealer tip and/or the at least one densified oxide dispersion strengthened layer.

9. The blade according to claim 1, further comprising a thermal barrier coating on the outer surfaces forming the pressure side and suction sides of the blade.

10. The blade according to claim 1, wherein the bottom portion stops prior to the radial height of the tip cap, wherein the top portion forms an approximately parallel line with the majority of the pressure side.

11. A blade for a turbine engine comprising:
a generally elongated airfoil comprising a leading edge, a trailing edge connecting a pressure side and a suction side, a radially outer tip cap having a tip cap upper surface at a tip end of the airfoil, a root coupled to the elongated airfoil generally opposite the tip end supporting the blade and for coupling the blade to a disc, and an internal cooling system formed from at least one cavity positioned within the generally elongated airfoil;
a squealer tip extending radially outward from the tip cap upper surface comprising at least a first tip cap rib and a second tip cap rib, wherein the squealer tip is at least one densified oxide dispersion strengthened layer deposited on and extending radially outward from the tip cap upper surface,
wherein at least one of the at least the first tip cap rib and the second tip cap rib is offset from an extension of one of the pressure side and suction side of the airfoil in a circumferential inward direction toward a center of the blade,
further comprising an acute angled ledge that extends out from the pressure side of the airfoil and radially outward at an acute angle away from the airfoil, wherein the acute angled ledge comprises a bottom portion and a top portion, wherein the top portion is approximately the same radial height as the tip cap upper surface, and wherein the at least one film cooling hole is positioned through the acute angled ledge exiting in the top portion.

12. The blade according to claim 11, wherein direct conduction cooling from the internal cooling system is applied to the at least one of the at least the first tip cap rib and the second tip cap of the squealer tip.

13. The blade according to claim 11, further comprising at least one film cooling hole positioned in between the first tip cap rib and an edge along the pressure side of the airfoil with an exhaust outlet of the at least one film cooling hole in the tip cap upper surface and an inlet that couples the at least one film cooling hole with the at least one cavity forming the internal cooling system.

14. The blade according to claim 11, further comprising thermal barrier coating on the tip cap upper surface and along each exposed side of the at least the first tip cap rib and the second tip cap of the squealer tip and/or the at least one densified oxide dispersion strengthened layer.

15. The blade according to claim 11, further comprising a thermal barrier coating on the outer surfaces forming the pressure side and suction sides of the blade.

16. The blade according to claim 11, wherein the bottom portion stops prior to the radial height of the tip cap, wherein the top portion forms an approximately parallel line with the majority of the pressure side.

\* \* \* \* \*